(12) United States Patent
Cobo et al.

(10) Patent No.: US 11,155,166 B2
(45) Date of Patent: Oct. 26, 2021

(54) OPERATOR DETECTION SYSTEM

(71) Applicant: Caterpillar Inc., Peoria, IL (US)

(72) Inventors: Michael A. Cobo, Saint Charles, IL (US); Mark A. Robinson, Davis Junction, IL (US); Justin Ayers, Peoria, IL (US); Scott Marks, Plainfield, IL (US); Joshua Mason, Washington, IL (US); Beau Berning, Naperville, IL (US)

(73) Assignee: Caterpillar Inc., Peoria, IL (US)

( * ) Notice: Subject to any disclaimer, the term of this patent is extended or adjusted under 35 U.S.C. 154(b) by 143 days.

(21) Appl. No.: 16/589,812

(22) Filed: Oct. 1, 2019

(65) Prior Publication Data

US 2021/0094417 A1    Apr. 1, 2021

(51) Int. Cl.
| | |
|---|---|
| B60K 28/04 | (2006.01) |
| B60N 2/02 | (2006.01) |
| B60N 2/75 | (2018.01) |
| E02F 9/26 | (2006.01) |
| B60N 2/00 | (2006.01) |
| E02F 9/20 | (2006.01) |
| E02F 3/34 | (2006.01) |

(52) U.S. Cl.
CPC .............. *B60K 28/04* (2013.01); *B60N 2/002* (2013.01); *B60N 2/753* (2018.02); *E02F 9/2083* (2013.01); *E02F 9/2087* (2013.01); *E02F 9/26* (2013.01); *E02F 3/3417* (2013.01)

(58) Field of Classification Search
CPC ..... E02F 3/3417; E02F 9/2083; E02F 9/2087; E02F 9/26; B60K 28/04; B60N 2/002; B60N 2/753
See application file for complete search history.

(56) References Cited

U.S. PATENT DOCUMENTS

| | | | |
|---|---|---|---|
| 6,062,331 A | 5/2000 | Grunow et al. | |
| 6,135,230 A * | 10/2000 | Schenck | B60K 28/04 180/269 |
| 6,186,260 B1 | 2/2001 | Schenck et al. | |
| 6,226,902 B1 * | 5/2001 | Heyne | E02F 9/2004 37/348 |
| 6,577,909 B1 * | 6/2003 | McGowan | G05B 9/02 180/271 |
| 6,856,873 B2 * | 2/2005 | Breed | B60N 2/002 180/271 |

(Continued)

*Primary Examiner* — Tyler J Lee

(74) *Attorney, Agent, or Firm* — Harrity & Harrity LLP

(57) ABSTRACT

A work machine may include a steering system, a user interface, a detection device, and a control device. The user interface may generate an input signal corresponding to operator input. The detection device may generate a detection signal corresponding to a presence of an operator relative to the user interface. The control device may determine that the operator is unavailable based on the detection signal and the input signal, and enable a lockout mode based on determining that the operator is unavailable. The control device may determine, while the lockout mode is enabled, a readiness indicator. The readiness indicator may confirm a readiness of the operator based on determining that the detection signal satisfies a readiness criterion. The control device may disable the lockout mode based on determining that the readiness criterion is satisfied.

20 Claims, 4 Drawing Sheets

(56) References Cited

U.S. PATENT DOCUMENTS

| | | | | |
|---|---|---|---|---|
| 7,757,806 B2* | 7/2010 | Bower | ............... | E02F 9/166 |
| | | | | 180/326 |
| 7,899,597 B2* | 3/2011 | Vitale | ............... | E02F 9/2095 |
| | | | | 701/50 |
| 8,485,301 B2* | 7/2013 | Grubaugh | ............... | B62D 33/06 |
| | | | | 180/273 |
| 2004/0073792 A1* | 4/2004 | Noble | ............... | G06F 21/35 |
| | | | | 713/168 |
| 2007/0203630 A1* | 8/2007 | Vitale | ............... | B60K 28/04 |
| | | | | 701/50 |
| 2015/0159613 A1* | 6/2015 | Jensen | ............... | B60W 10/06 |
| | | | | 701/68 |
| 2019/0331761 A1* | 10/2019 | Wynn | ............... | E02F 9/205 |

\* cited by examiner

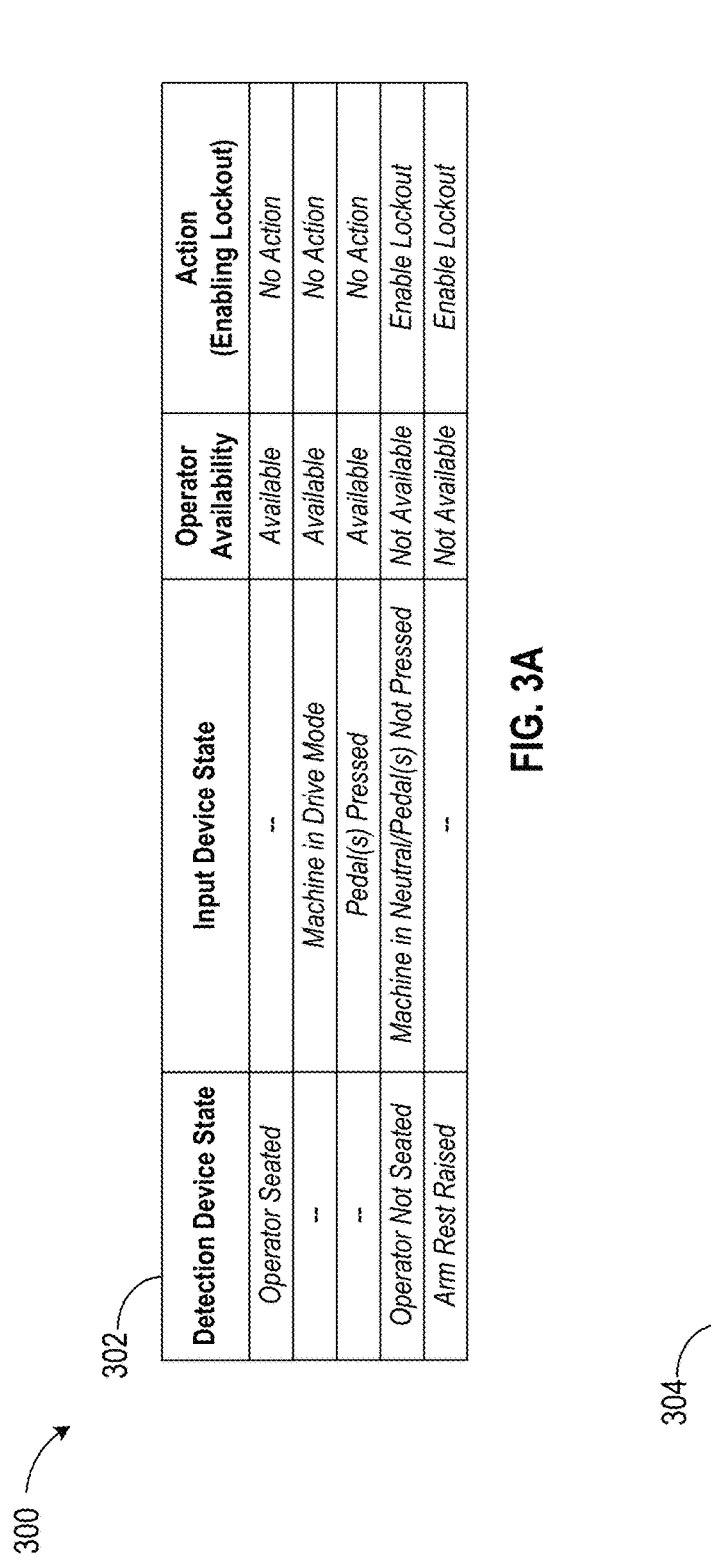

OPERATOR DETECTION SYSTEM

TECHNICAL FIELD

The present disclosure relates generally to work machines and, for example, to an operator detection system for work machines.

BACKGROUND

A work machine may be provided with a steering system that allows the work machine to shift, lean, pivot, rotate, articulate, and/or otherwise move when stationary. A work machine may also be provided with an implement system that allows an implement to be manipulated and/or moved relative to the work machine when stationary. The steering system and the implement system may be manually controlled by an operator via a user interface provided within an operator cab of the work machine. The user interface may include an input device that enables the operator to control a steering function, an implement function, a propulsion function, a transmission function, and/or another function of the work machine. When not in use, one or more functions of the work machine may be disabled by the operator to avoid inadvertent steering input and/or implement input. In some cases, an operator may neglect to disable a function of the work machine prior to exiting the operator cab and inadvertently input a command (e.g., while exiting, entering, or moving about the operator cab) that causes the work machine and/or the implement to move and potentially collide with a nearby object.

Some work machines may be provided with an automated control mechanism that detects when the operator is not present in the operator cab, disables a function of the work machine if the operator is not present, and enables a function of the work machine if the operator is present. The control mechanism may use a seat sensor to detect when the operator is seated in the operator cab. In some cases, such as when an arm rest or another restraining device may need to be raised or otherwise adjusted by the operator in order to exit the operator cab, the control mechanism may use an arm rest sensor to detect when the operator exits the operator cab. The control mechanism may be designed to automatically disable a function of the work machine (e.g., a steering function and/or an implement function) if the seat sensor and the arm rest sensor indicate that the operator is not present (e.g., the operator is not seated and the arm rest has been raised). The control mechanism may automatically enable the function of the work machine if the seat sensor and the arm rest sensor indicate that the operator has returned (e.g., the operator is seated and the arm rest has been lowered). The control mechanism, once engaged, may be useful in reducing inadvertent steering input and/or implement input. However, the control mechanism may not always engage or disengage at appropriate times.

In some cases, the seat sensor of the control mechanism may falsely infer a presence or an absence of the operator. For example, if a weight of the operator shifts during an operation of the work machine (e.g., while on an incline or a graded surface), the seat sensor may incorrectly interpret the shift in weight as an absence of the operator and improperly cause a function of the work machine to be disabled during the operation. Furthermore, if the operator leans or otherwise applies pressure on the seat (e.g., to reach something behind the seat and/or the like) while the work machine is not in use, the seat sensor may incorrectly interpret the pressure as a presence of the operator and improperly cause a function of the machine to be enabled. An arm rest sensor may also be inadequate to reliably identify a presence or an absence of the operator. For example, in some work machines with larger operator cabs, the operator may not need to raise the arm rest in order to exit or enter the operator cab. If the operator exits the operator cab without raising the arm rest, the arm rest sensor may incorrectly indicate that the operator is present, and cause a function of the work machine to remain enabled. If a steering function and/or an implement function remains enabled, the operator may inadvertently cause steering input and/or implement input as the operator exits or returns to the operator cab.

One solution for limiting inadvertent steering input to a work machine is disclosed in U.S. Pat. No. 6,062,331, issued to Grunow, et al., and filed on Oct. 9, 1998 ("the '331 patent"). The '331 patent discloses an auxiliary hydraulic circuit that is typically enabled through an interlock control system associated with a particular work machine, such as by meeting or fulfilling the specific operator restraint mechanism/seat switch criteria associated with the particular work machine. The '331 patent discloses that the auxiliary hydraulic circuit along with the main hydraulic circuit controlling the implement control system will also typically be disabled by the interlock control system if operator parameters established for the interlock control system are not maintained during normal operations. Although the interlock control system of the '331 patent may be used to enable or disable a function of the work machine based on a state of an operator, it would be beneficial to further verify a readiness of the operator prior to enabling the function. Furthermore, while the interlock control system of the '331 patent disables a function of the work machine by disabling an associated hydraulic circuit, it is desirable in some instances to lock out the function.

An operator detection system of the present disclosure overcomes one or more of the shortcomings set forth above.

SUMMARY

According to some implementations, a method may include receiving, by a device, a detection signal from a detection device of a work machine, the detection signal including information relating to a presence of an operator relative to a user interface of the work machine; determining, by the device, that the operator is unavailable, based on the detection signal; enabling, by the device, a lockout mode based on determining that the operator is unavailable, the lockout mode being configured to restrict operator control of at least one function of the work machine; determining, by the device, while the lockout mode is enabled, a readiness indicator, the readiness indicator confirming a readiness of the operator to operate the work machine based on determining that the detection signal satisfies a readiness criterion; and disabling, by the device, the lockout mode based on determining that the readiness criterion is satisfied.

According to some implementations, a device may include one or more memories; and one or more processors, communicatively coupled to the one or more memories. The one or more processors may be configured to receive a detection signal from a detection device of a work machine, the detection signal including information relating to a presence of an operator relative to a user interface of the work machine; receive an input signal from an input device of the user interface, the input signal including information relating to operator input; determine that the operator is unavailable, based on the detection signal and the input signal; enable a lockout mode based on determining that the operator is unavailable, the lockout mode being configured to restrict operator control of a function of the work machine; determine, while the lockout mode is enabled, a readiness indicator, the readiness indicator confirming a readiness of the operator to operate the work machine based on determining that the detection signal and the input signal satisfy a readiness criterion; and cause an action to be performed in connection with one or more of the lockout mode or the readiness criterion.

According to some implementations, a work machine may include a steering system; a user interface configured to generate an input signal corresponding to operator input; a detection device configured to generate a detection signal corresponding to a presence of an operator relative to the user interface; and a control device in communication with the steering system, the user interface, and the detection device. The control device may be configured to determine that the operator is unavailable, based on the detection signal and the input signal, enable a lockout mode based on determining that the operator is unavailable, the lockout mode restricting operator control of the steering system, determine, while the lockout mode is enabled, a readiness indicator, the readiness indicator confirming a readiness of the operator based on determining that the detection signal and the input signal satisfy a readiness criterion, and disable the lockout mode based on determining that the readiness criterion is satisfied.

BRIEF DESCRIPTION OF THE DRAWINGS

FIGS. 3A and 3B are diagrams of an example implementation of an operator detection system described herein

DETAILED DESCRIPTION

Figure 1:
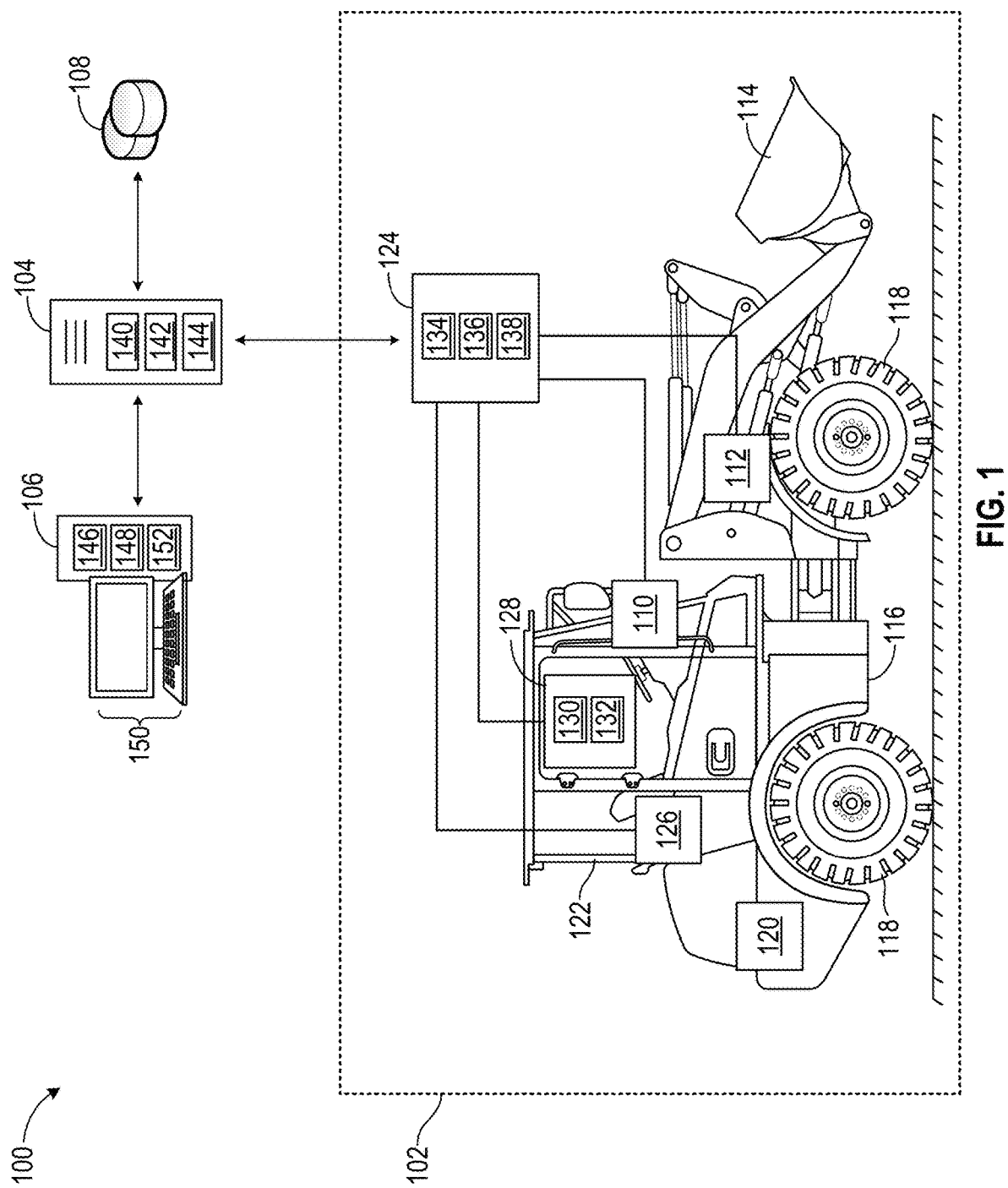
FIG. 1 is a diagram of an example operator detection system described herein.

FIG. 1 is a diagram of an example operator detection system 100 described herein. As shown in FIG. 1, operator detection system 100 may include a work machine 102, a management platform 104, a control station 106, a network storage device 108, and/or another device configured to facilitate operation of work machine 102 within an associated worksite. Work machine 102 (e.g., a wheel loader, a track type tractor, a motor grader, a dozer, an excavator, and/or the like) may include a steering system 110 that enables a steering function of work machine 102, an implement system 112 that enables an implement function of work machine 102, and/or another system that enables another function of work machine 102. Implement system 112 may enable an operator to operate an implement 114. Operator detection system 100 may be used to detect an availability of the operator relative to work machine 102, enable a lockout mode to restrict operator control of steering system 110 and/or implement system 112 if the operator is unavailable, detect a presence and a readiness of the operator to operate work machine 102, and disable the lockout mode to restore operator control of steering system 110 and/or implement system 112 if the operator is present and ready.

In some implementations, operator detection system 100 may include multiple work machines 102 and/or multiple control stations 106 that interact with management platform 104 and/or network storage device 108. In some examples, operator detection system 100 may include multiple management platforms 104 and/or multiple network storage devices 108 that interact with one or more work machines 102 and/or one or more control stations 106. In some examples, operator detection system 100 may be used with a semi-autonomously operated work machine 102. For example, management platform 104 of operator detection system 100 may be used to guide, navigate, and/or control a semi-autonomous work machine 102 based on an operating condition of work machine 102, location data of work machine 102, location data of another work machine 102, coordinate data associated with a worksite or a facility associated with work machine 102, coordinate data associated with a target work path, coordinate data associated with a target site plan, and/or the like. In some examples, work machine 102 may receive guidance, navigation, and/or control information from a remote operator via control station 106, from an operator local to work machine 102, and/or from another device of operator detection system 100.

As further shown in FIG. 1, work machine 102 includes a steering system 110, an implement system 112, an implement 114, a frame 116, traction elements 118, an engine 120, an operator cab 122, and a control device 124. Steering system 110 may be supported by frame 116 and include an electrohydraulic system, an electromechanical system, a hydromechanical system, and/or another system that enables work machine 102 and/or traction elements 118 to turn, lean, and/or otherwise perform a steering function directed by an operator. Additionally, or alternatively, steering system 110 may enable an articulation of work machine 102 to perform a steering function. Implement system 112 may be supported by frame 116 and include an electrohydraulic system, an electromechanical system, a hydromechanical system, and/or another system that enables implement 114 to be operated and/or manipulated to perform an implement function directed by an operator. Implement 114 may include a blade, a ripper, a winch, a bucket, a sheer, a hammer, and/or another tool associated with work machine 102. Traction elements 118 may include wheels, tracks, and/or the like that are movably coupled to frame 116 and caused to be driven by engine 120. Engine 120 may include a diesel engine, a gasoline engine, a natural gas engine, a hybrid engine, an electric motor, and/or another power source configured to propel work machine 102.

Operator cab 122 includes an enclosure and/or another structure that is coupled to frame 116 and configured to support an operator of work machine 102. Operator cab 122 may include a detection device 126 and a user interface 128. Detection device 126 may include a seat sensor (e.g., installed in a seat of work machine 102 and configured to detect a weight of the operator), an arm rest sensor (e.g., installed in an arm rest of work machine 102 and configured to detect a position of the arm rest), an arm rest latch (e.g., installed in the arm rest and configured to detect a change in position and/or a motion of the arm rest), and/or the like. In some examples, detection device 126 may include an optic device, an imaging device, a microphone, a thermal detection device, a radio frequency identification (RFID) device, and/or another device that can be used to detect an availability or a presence of an operator relative to operator cab 122 and/or user interface 128 of operator cab 122. User interface 128 may include an input device 130 and/or an output device 132. Input device 130 may include a brake control pedal, a torque control pedal, a throttle control pedal, a clutch pedal, a direction control switch, a steering control lever, an implement control lever, a control panel, a touchscreen display, a microphone, and/or another device configured to receive operator input (e.g., an instruction, a command, and/or another operating parameter for operating work machine 102, steering system 110, and/or implement system 112). Output device 132 may include a display, a speaker, a haptic device, and/or another device configured to provide feedback to an operator (e.g., associated with an operating condition of work machine 102, steering system 110, and/or implement system 112, a progress of an operation, a historic event associated with work machine 102, a visual model and/or a map of a worksite, a target work path, and/or a target site plan).

Control device 124 includes a processor 134, a memory 136, and a communication device 138. Processor 134 is implemented in hardware, firmware, and/or a combination of hardware and software capable of being programmed to perform a function associated with work machine 102 and/or operator detection system 100. Memory 136 includes a random-access memory (RAM), a read only memory (ROM), and/or another type of dynamic or static storage device that stores information and/or instructions to be performed by processor 134. Communication device 138 includes a wireless local area network (WLAN) component (e.g., a Wi-Fi component), a radio frequency (RF) communication component (e.g., a Bluetooth component), a positioning component (e.g., a global positioning system (GPS) component, a global navigation satellite system (GNSS) component), and/or the like. Communication device 138 may enable processor 134 to exchange information (e.g., a detection signal provided by detection device 126, an input signal provided by user interface 128, a historic event associated with work machine 102, an operating condition of work machine 102, an operating parameter of work machine 102, a progress of an operation, a visual model and/or a map of a worksite, a target work path, and/or a target site plan) with management platform 104, control station 106, and/or network storage device 108. Control device 124 may communicate with control station 106 and/or network storage device 108 directly and/or indirectly via management platform 104.

In some implementations, control device 124 may receive a detection signal from detection device 126 and an input signal from input device 130. The detection signal may include information that can be used to determine an availability or a presence of the operator relative to operator cab 122 and/or a readiness of the operator to operate work machine 102. For example, the detection signal may include an electrical signal provided via a seat sensor configured to detect a weight of the operator, an arm rest sensor configured to detect a position of the arm rest, an arm rest latch configured to detect a change in position and/or a motion of the arm rest, and/or another device configured to detect an availability or a presence of the operator relative to operator cab 122. The input signal may include information relating to operator input that can be used to infer an availability, a presence, and/or a readiness of the operator. For example, the input signal may include an electrical signal provided via a brake control pedal, a torque control pedal, a throttle control pedal, a clutch pedal, a direction control switch, a steering control lever, an implement control lever, a control panel, a touchscreen display, a microphone, and/or another device configured to receive an instruction, a command, and/or another operating parameter from an operator, for operating work machine 102, steering system 110, and/or implement system 112.

In some implementations, control device 124 may determine an availability of the operator based on the detection signal and/or the input signal. Control device 124 may determine that the operator is unavailable if the detection signal and/or the input signal indicate that the operator is neither present relative to user interface 128 nor providing operator input via user interface 128. For example, control device 124 may determine that the operator is unavailable if a seat sensor indicates that the operator is not seated in a seat of operator cab 122, a direction control switch indicates that work machine 102 is in neutral and/or a parked mode, and a brake control throttle indicates that the operator is not inputting a brake command. In some examples, control device 124 may determine that the operator is unavailable if an arm rest sensor and/or an arm rest latch indicates that the operator raised an arm rest (e.g., to exit operator cab 122). Control device 124 may determine that the operator is available if the detection signal and/or the input signal indicate that the operator is either present relative to user interface 128 or providing operator input via user interface 128. For example, control device 124 may determine that the operator is available if a seat sensor indicates that the operator is seated, a direction control switch indicates that work machine 102 is operating in a drive mode (e.g., in forward or reverse gear), or a brake control pedal indicates that the operator is inputting a brake command. In some examples, control device 124 may determine whether a state suggested by the detection signal and/or the input signal persists for a threshold period of time before concluding that the operator is available or unavailable.

In some implementations, control device 124 may enable a lockout mode if the operator is determined to be unavailable. If a parking brake was not engaged by the operator, control device 124 may engage the parking brake prior to enabling the lockout mode. If work machine 102 is in motion when the operator becomes unavailable, control device 124 may wait to engage the parking brake once work machine 102 becomes stationary. The lockout mode may be configured to restrict operator control of at least one function of work machine 102 so as to prevent inadvertent motion of work machine 102 while the operator is not present or not ready to operate work machine 102. For example, control device 124 may restrict operator control of a steering function, an implement function, a propulsion function, a transmission function, and/or another function of work machine 102. The lockout mode may disable electrical communication between input device 130 and steering system 110 and/or between input device 130 and implement system 112, and maintain operation of steering system 110 and/or implement system 112 (e.g., to avoid abrupt loss in power that may be harmful to work machine 102). In some examples, during the lockout mode, steering system 110 and/or implement system 112 may be operated by an autonomous control mode (e.g., a cool down mode, an idle mode, a sleep mode, a fuel save mode, a battery save mode, and/or the like) configured to preserve work machine 102. Additionally, or alternatively, the lockout mode may electromechanically disable input device 130 (e.g., to physically lock and prevent movement of input device 130), and/or disable power to steering system 110, implement system 112, and/or work machine 102.

In some implementations, control device 124 may determine a readiness of the operator while the lockout mode is enabled in order to ensure that the operator is not only present in operator cab 122, but also ready to operate work machine 102 prior to restoring operator controls. Control device 124 may determine that the operator is available based on a detection signal (e.g., via a seat sensor, an arm rest sensor, an arm rest latch, and/or another type of detection device 126) and/or an input signal (e.g., via a brake control pedal, a torque control pedal, a throttle control pedal, a clutch pedal, a direction control switch, a steering control lever, an implement control lever, a control panel, a touchscreen display, a microphone, and/or another type of input device 130). Control device 124 may determine a readiness indicator (e.g., indicating that the operator is ready to operate work machine 102) based on the detection signal and/or the input signal and satisfaction of a readiness criterion. For example, the readiness criterion may be satisfied if an arm rest sensor and/or an arm rest latch indicate that the arm rest has been cycled (e.g., raised and lowered during and/or in relation to the lockout mode). In some examples, the readiness criterion may be satisfied if a brake control pedal is depressed a threshold amount and/or for a threshold duration. Additionally, or alternatively, the readiness criterion may be satisfied using another type of operator input, another type of detection device 126, and/or another type of input device 130.

In some implementations, control device 124 may use output device 132 of user interface 128 to prompt the operator with visual and/or audible instructions for satisfying the readiness criterion and disabling the lockout mode. For example, output device 132 may instruct the operator to raise and lower the arm rest and/or depress the brake control pedal a threshold amount and/or for a threshold duration to disable the lockout mode. In some examples, control device 124 may use output device 132 to instruct the operator to provide a different type of operator input and/or a different combination of operator inputs to disable the lockout mode. For example, control device 124 may instruct the operator to input a sequence of commands via input device 130, input a gesture (e.g., via a touchscreen display), provide a verbal command (e.g., via a microphone), and/or the like. In some examples, control device 124 may randomly generate the readiness criterion or select the readiness criterion from a set of preprogrammed readiness criteria. Additionally, or alternatively, control device 124 may use output device 132 to provide the operator with information relating to the lockout mode. For example, output device 132 may provide a visual notification, an audible notification, and/or a haptic notification indicating whether the lockout mode is enabled or disabled, the function of work machine 102 that is enabled or disabled, the readiness criterion needed to disable the lockout mode, an availability and/or a readiness of the operator, and/or the like.

In some implementations, control device 124 may cause an action to be performed in connection with the lockout mode. For example, control device 124 may disable the lockout mode and restore operator control of one or more functions of work machine 102 based on determining that the readiness criterion is satisfied. If the lockout mode was used to disable electrical communication between input device 130 (e.g., steering control lever and/or implement control lever) and steering system 110 and/or implement system 112, control device 124 may enable or restore the electrical communication between input device 130 and steering system 110 and/or implement system 112 upon satisfaction of the readiness criterion. If the lockout mode was used to electromechanically lock input device 130 in a fixed position, control device 124 may electromechanically unlock input device 130 upon satisfaction of the readiness criterion. If the lockout mode was used to disable power to steering system 110 and/or implement system 112, control device 124 may restore power to steering system 110 and/or implement system 112 upon satisfaction of the readiness criterion. If a parking brake was engaged via control device 124 during the lockout mode, control device 124 may restrict operator control of the parking brake (e.g., prevent the operator from releasing the parking brake) until the readiness criterion is satisfied (e.g., until operator control of steering system 110 and/or implement system 112 is restored).

In some implementations, control device 124 may implement a debounce period (e.g., a fixed duration or a variable duration) in association with the lockout mode to prevent potential harm to components of work machine 102 that may be caused by abrupt and/or rapid state changes. For example, a debounce period may be implemented prior to enabling or disabling the lockout mode, steering system 110, implement system 112, and/or the like. The debounce period may vary based on the component and/or the system of work machine 102 the debounce period is intended to protect. In some examples, control device 124 may generate a lockout event based on determining that the lockout mode was enabled, generate a record and/or a notification of the lockout event, and transmit the record and/or the notification to management platform 104, control station 106, and/or network storage device 108 to be stored in connection with work machine 102. The record and/or the notification may include information relating to a time of the lockout event, a location of work machine 102 at the time of the lockout event, a duration of the lockout event, an operating condition of work machine 102 at the time of the lockout event, an operating parameter of work machine 102 at the time of the lockout event, an identification (e.g., a model type, a model name, a model number, a serial number, an identification number, and/or another identifier) of work machine 102, an identification of the operator causing the lockout event, and/or the like. One or more functions described as being performed by control device 124 may be performed by management platform 104, control station 106, and/or network storage device 108. In some examples, one or more functions described as being performed by control device 124 may be performed by circuitry (e.g., an arrangement of switches, latches, relays, and/or the like) configured to enable or disable a lockout mode based on an availability, a presence, and/or a readiness of an operator.

As further shown in FIG. 1, management platform 104 includes a processor 140, a memory 142, and a communication device 144. Processor 140 is implemented in hardware, firmware, and/or a combination of hardware and software capable of being programmed to perform a function associated with work machine 102 and/or operator detection system 100. Memory 142 includes a RAM, a ROM, and/or another type of dynamic or static storage device that stores information and/or instructions to be performed by processor 140. Communication device 144 includes a WLAN component, an RF communication component, a positioning component, and/or the like. Communication device 144 may enable processor 140 to exchange information (e.g., a detection signal provided by detection device 126, an input signal provided by user interface 128, a lockout event associated with work machine 102, a record and/or a notification relating to a lockout event of work machine 102, an operating condition of work machine 102, an operating parameter of work machine 102, a progress of an operation, a visual model and/or a map of a worksite, a target work path, and/or a target site plan) with control device 124 of work machine 102, control station 106, and/or network storage device 108.

As further shown in FIG. 1, control station 106 includes a processor 146, a memory 148, a user interface 150, and a communication device 152. Processor 146 is implemented in hardware, firmware, and/or a combination of hardware and software capable of being programmed to perform a function associated with work machine 102 and/or operator detection system 100. Memory 148 includes a RAM, a ROM, and/or another type of dynamic or static storage device that stores information and/or instructions to be performed by processor 146. User interface 150 includes an input device and/or an output device. The input device may enable a remote operator of work machine 102 to specify an instruction, a command, and/or another parameter for operating work machine 102, steering system 110, and/or implement system 112. The output device may enable a remote operator of work machine 102 to access information relating to work machine 102, steering system 110, implement system 112, and/or operator detection system 100 (e.g., a detection signal provided by detection device 126, an input signal provided by user interface 128, a lockout event associated with work machine 102, a record and/or a notification relating to a lockout event of work machine 102, an operating condition of work machine 102, an operating parameter of work machine 102, a progress of an operation, a visual model and/or a map of a worksite, a target work path, a target site plan, and/or the like).

Communication device 152 includes a WLAN component, an RF communication component, a positioning component, and/or the like. Communication device 152 may enable processor 146 to exchange information (e.g., a detection signal provided by detection device 126, an input signal provided by user interface 128, a lockout event associated with work machine 102, a record and/or a notification relating to a lockout event of work machine 102, an operating condition of work machine 102, an operating parameter of work machine 102, a progress of an operation, a visual model and/or a map of a worksite, a target work path, and/or a target site plan) with control device 124 of work machine 102, management platform 104, and/or network storage device 108. In some examples, control station 106 may communicate with control device 124 of work machine 102 and/or network storage device 108 directly and/or indirectly via management platform 104. Additionally, or alternatively, control station 106 may serve as a user interface of management platform 104. In some examples, control station 106 may implement a lockout mode that restricts local operator control of work machine 102 via user interface 128. In some examples, control device 124 may implement a lockout mode that restricts remote operator control of work machine 102 via user interface 150 of control station 106.

As further shown in FIG. 1, network storage device 108 includes one or more devices capable of storing, processing, and/or routing information. Network storage device 108 may include, for example, a server device, a device that stores a data structure, a device in a cloud computing environment or a data center, and/or the like. In some examples, network storage device 108 may include a communication interface that allows network storage device 108 to receive information from and/or transmit information to control device 124 of work machine 102, management platform 104, control station 106, and/or another device associated with operator detection system 100. In some examples, network storage device 108 may store information relating to work machine 102 and/or operator detection system 100 (e.g., a detection signal provided by detection device 126, an input signal provided by user interface 128, a lockout event associated with work machine 102, a record and/or a notification relating to a lockout event of work machine 102, an operating condition of work machine 102, an operating parameter of work machine 102, a progress of an operation, a visual model and/or a map of a worksite, a target work path, and/or a target site plan).

As indicated above, FIG. 1 is provided as an example. Other examples may differ from what was described in connection with FIG. 1.

Figure 2A:
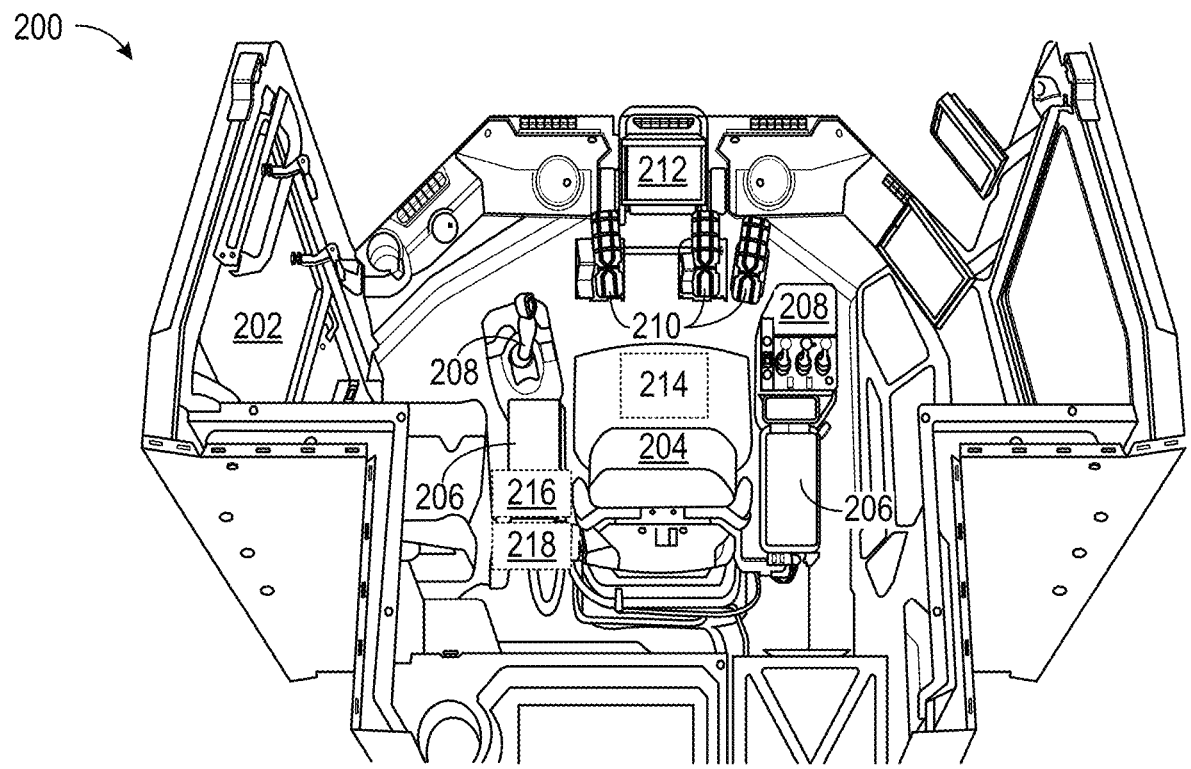
FIGS. 2A and 2B are diagrams of an example operator cab described herein.
Figure 2B:
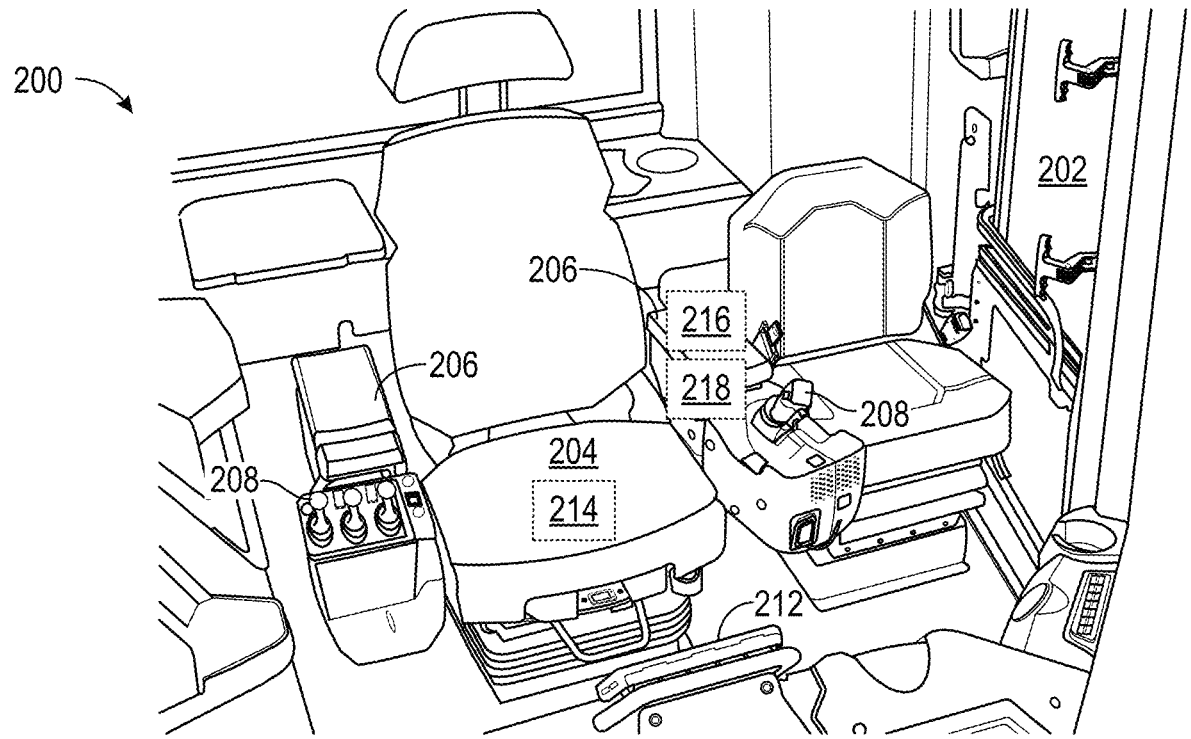

FIGS. 2A and 2B are diagrams of an example operator cab 200 (e.g., operator cab 122 in FIG. 1) described herein. As shown, operator cab 200 includes an entryway 202, a seat 204, an arm rest 206, a control lever 208, a pedal 210, and a display 212. Entryway 202 is disposed at a side of operator cab 200 and configured to allow an operator to enter or exit operator cab 200. Seat 204 is disposed within operator cab 200 and configured to support an operator during operation of work machine 102. Seat 204 may include a seat sensor 214 (e.g., a pressure sensor, a switch, a proximity sensor, and/or the like) configured to detect when the operator is seated in seat 204 and generate a detection signal corresponding to an availability or a presence of the operator. Arm rest 206 is coupled to seat 204 and/or operator cab 200 and movable relative to seat 204 (e.g., vertically pivotable between a lowered position and a raised position, horizontally pivotable between a closed position and an open position, and/or the like). For example, arm rest 206 may be lowered to provide the operator access to control lever 208 or raised to facilitate access to and from seat 204. Arm rest 206 may include a combination of an arm rest sensor 216 and/or an arm rest latch 218 (e.g., a combination of a switch, an encoder, a pressure sensor, a proximity sensor, and/or the like) configured to detect a position, a change in position, a motion, and/or another state of arm rest 206, and generate a detection signal corresponding to the state of arm rest 206.

Control lever 208 is disposed on arm rest 206 and includes a steering control lever, an implement control lever, and/or another type of input device 130 of work machine 102. Control lever 208 may be configured to be manipulated, handled, and/or otherwise used by the operator to control a function of work machine 102. For example, control lever 208 may be in operative communication with steering system 110, implement system 112, and/or another system of work machine 102. In some examples, control lever 208 may be provided in a form of a joystick, a control knob, a dial, a wheel, a touchscreen display, and/or another type of input device 130 of work machine 102. Pedal 210 is positioned relative to a floor of operator cab 200 and/or seat 204 and includes a brake control pedal, a torque control pedal, a throttle control pedal, a clutch pedal, and/or another type of input device 130 of work machine 102. Pedal 210 may be configured to be depressed and/or otherwise used by the operator to control a braking function, a torque control function, a propulsion function, a gear change function, and/or another type of function of work machine 102. For example, pedal 210 may be in operative communication with traction elements 118, engine 120, a transmission, a braking system, and/or another component of work machine 102.

Display 212 is disposed within operator cab 200 and includes a light-emitting diode display (LED), an electroluminescent display (ELD), a plasma display panel (PDP), a liquid crystal display (LCD), an organic light-emitting diode display (OLED), and/or another type of output device 132 of work machine 102. Display 212 may be configured to display information to an operator (e.g., an operating condition of work machine 102, steering system 110, and/or implement system 112, a progress of an operation, a historic event associated with work machine 102, a visual model and/or a map of a worksite, a target work path, and/or a target site plan). In some examples, display 212 may be used to provide the operator with information relating to a lockout mode. For example, display 212 may provide a notification indicating whether the lockout mode is enabled or disabled, a function of work machine 102 that is enabled or disabled, a readiness criterion needed to disable the lockout mode, an instruction for satisfying the readiness criterion, an availability and/or a readiness of the operator, and/or the like. Additionally, or alternatively, display 212 may include a touchscreen display configured to receive a gesture from the operator and serve as another type of input device 130 of work machine 102. In some examples, operator cab 200 may include a speaker, a haptic device, and/or another type of output device 132.

As indicated above, FIGS. 2A and 2B are provided as an example. Other examples may differ from what is described in connection with FIGS. 2A and 2B.

FIGS. 3A and 3B are diagrams of an example implementation 300 of operator detection system 100 described herein. As shown in FIG. 3A, and by reference number 302, control device 124 may monitor an availability of an operator during operation of work machine 102 to determine whether a lockout mode should be enabled. Control device 124 may determine the availability of the operator based on a state of detection device 126 and/or a state of input device 130. Control device 124 may determine the state of detection device 126 based on a detection signal provided by detection device 126 (e.g., seat sensor 214, arm rest sensor 216, arm rest latch 218, and/or another type of detection device 126). Detection device 126 may indicate whether the operator is seated, whether arm rest 206 is raised, and/or another indication that can be used to infer an availability of the operator. Control device 124 may determine the state of input device 130 based on an input signal provided by input device 130 (e.g., control lever 208, pedal 210, and/or another type of input device 130). Input device 130 may indicate whether work machine 102 is in a drive mode (e.g., forward or reverse gear), whether pedal 210 is pressed, and/or another indication that can be used to infer an availability of the operator.

In some implementations, control device 124 may determine that the operator is available if seat sensor 214 indicates that the operator is seated, input device 130 indicates that work machine 102 is operating in a drive mode (e.g., not in neutral), or brake control pedal 210 indicates that the operator is inputting a brake command. If control device 124 determines that the operator is available, control device 124 may maintain operator control of work machine 102 and take no action. Control device 124 may determine that the operator is unavailable if seat sensor 214 indicates that the operator is not seated in seat 204, arm rest sensor 216 indicates that arm rest 206 is in a raised position, input device 130 indicates that work machine 102 is in neutral, and/or brake control pedal 210 indicates that the operator is not inputting a brake command. If control device 124 determines that the operator is unavailable, control device 124 may enable a lockout mode (e.g., to restrict operator control of steering system 110, implement system 112, and/or the like). In some examples, control device 124 may determine availability using another type of detection device 126 (e.g., arm rest latch 218 and/or the like) and/or another type of input device 130 (e.g., a torque control pedal, a throttle control pedal, a clutch pedal, a direction control switch, a steering control lever, an implement control lever, a control panel, a touchscreen display, a microphone, and/or the like).

As further shown in FIG. 3B, and by reference number 304, control device 124 may monitor a presence and/or a readiness of the operator to determine whether a previously enabled lockout mode should be disabled. Control device 124 may determine the presence of the operator based on the state of detection device 126 (e.g., seat sensor 214, arm rest sensor 216, arm rest latch 218, and/or another type of detection device 126) and/or the state of input device 130 (e.g., control lever 208, pedal 210, and/or another type of input device 130). For example, control device 124 may determine that the operator is not present if seat sensor 214 indicates that the operator is not seated in seat 204. If control device 124 determines that the operator is not present, control device 124 may maintain the lockout mode and take no action. Control device 124 may determine that the operator is present if seat sensor 214 indicates that the operator is seated in seat 204. If control device 124 determines that the operator is present, control device 124 may determine a readiness of the operator to ensure that the operator is ready to operate work machine 102 prior to disabling the lockout mode. In some examples, control device 124 may be configured to disable the lockout mode based on a readiness of the operator (e.g., irrespective of a presence of the operator).

In some implementations, control device 124 may determine the readiness of the operator based on satisfaction of a readiness criterion. In some examples, the readiness criterion may be satisfied if arm rest sensor 216 and/or arm rest latch 218 indicate that arm rest 206 has been cycled (e.g., raised and lowered in association with the lockout mode). For example, if arm rest 206 was raised to enable the lockout mode, lowering arm rest 206 during the lockout mode may satisfy the readiness criterion. If arm rest 206 was not raised to enable the lockout mode, raising and lowering arm rest 206 during the lockout mode may satisfy the readiness criterion. In some examples, the readiness criterion may be satisfied if brake control pedal 210 is depressed a threshold amount (e.g., approximately 10% or more of a travel depth of brake control pedal 210) and/or for a threshold duration (e.g., for longer than 5 seconds, and/or the like). In some examples, the readiness criterion may be satisfied using another type of operator input, another type of detection device 126, and/or another type of input device 130 (e.g., a torque control pedal, a throttle control pedal, a clutch pedal, a direction control switch, a steering control lever, an implement control lever, a control panel, a touchscreen display, a microphone, and/or the like).

In some implementations, control device 124 may determine that the operator is not ready to operate work machine 102 if the readiness criterion is not met (e.g., arm rest 206 has not been cycled, brake control pedal 210 has not been depressed for a threshold amount and/or for a threshold duration, and/or the like). If control device 124 determines that the operator is not ready to operate work machine 102, control device 124 may maintain the lockout mode and take no action. Control device 124 may determine that the operator is ready to operate work machine 102 if seat sensor 214 indicates that the operator is seated and if arm rest sensor 216 and/or arm rest latch 218 indicate that arm rest 206 has been cycled. Additionally, or alternatively, control device 124 may determine that the operator is ready to operate work machine 102 if seat sensor 214 indicates that the operator is seated and if brake control pedal 210 is depressed a threshold amount and/or for a threshold duration. If control device 124 determines that the operator is ready to operate work machine 102, control device 124 may disable the lockout mode and restore operator control of steering system 110, implement system 112, and/or another system of work machine 102.

As indicated above, FIGS. 3A and 3B are provided as an example. Other examples may differ from what is described in connection with FIGS. 3A and 3B.

Figure 4:
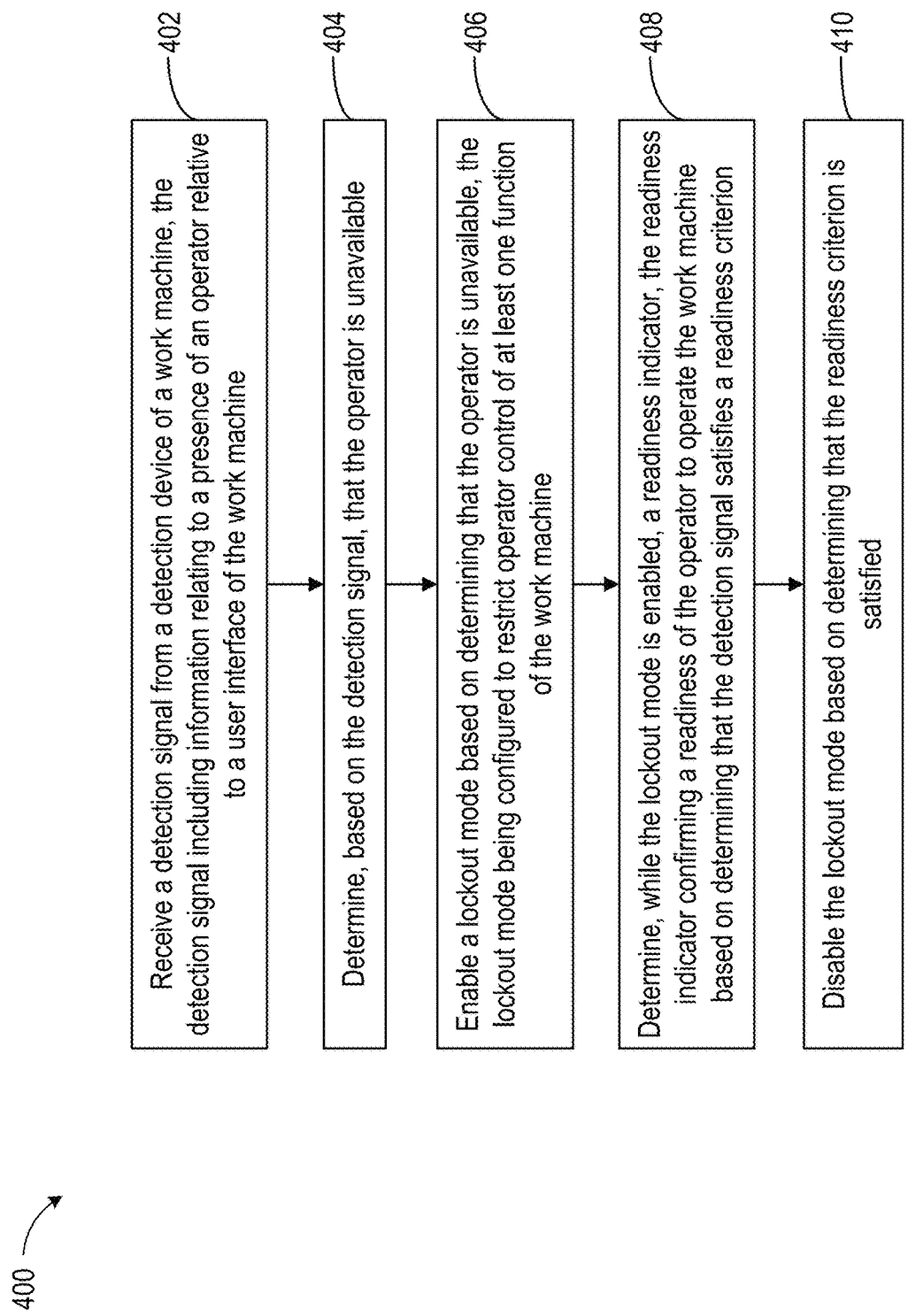
FIG. 4 is a flow chart of an example process for detecting an operator of a work machine.

FIG. 4 is a flow chart of an example process 400 for detecting an operator of a work machine. One or more process blocks of FIG. 4 may be performed by a control device of a work machine (e.g., control device 124 of work machine 102) and/or by another component or a group of components separate from or including the control device (e.g., management platform 104, control station 106, network storage device 108, and/or another device of operator detection system 100).

As shown in FIG. 4, process 400 may include receiving a detection signal from a detection device of a work machine, the detection signal including information relating to a presence of an operator relative to a user interface of the work machine (block 402). For example, the control device (e.g., using processor 134, memory 136, communication device 138, and/or the like) may receive a detection signal from a detection device of a work machine, as described above. The detection signal may include information relating to a presence of an operator relative to a user interface of the work machine.

As further shown in FIG. 4, process 400 may include determining, based on the detection signal, that the operator is unavailable (block 404). For example, the control device (e.g., using processor 134, memory 136, communication device 138, and/or the like) may determine, based on the detection signal, that the operator is unavailable, as described above.

As further shown in FIG. 4, process 400 may include enabling a lockout mode based on determining that the operator is unavailable, the lockout mode being configured to restrict operator control of at least one function of the work machine (block 406). For example, the control device (e.g., using processor 134, memory 136, communication device 138, and/or the like) may enable a lockout mode based on determining that the operator is unavailable, as described above. The lockout mode may be configured to restrict operator control of at least one function of the work machine.

As further shown in FIG. 4, process 400 may include determining, while the lockout mode is enabled, a readiness indicator, the readiness indicator confirming a readiness of the operator to operate the work machine based on determining that the detection signal and the input signal satisfy a readiness criterion (block 408). For example, the control device (e.g., using processor 134, memory 136, communication device 138, and/or the like) may determine, while the lockout mode is enabled, a readiness indicator, as described above. The readiness indicator may confirm a readiness of the operator to operate the work machine based on determining that the detection signal satisfies a readiness criterion.

As further shown in FIG. 4, process 400 may include disabling the lockout mode based on determining that the readiness criterion is satisfied (block 410). For example, the control device (e.g., using processor 134, memory 136, communication device 138, and/or the like) may disable the lockout mode based on determining that the readiness criterion is satisfied, as described above.

Process 400 may include variations and/or additional implementations to those described in connection with FIG. 4, such as any single implementation or any combination of implementations described elsewhere herein. Although FIG. 4 shows example blocks of process 400, in some examples, process 400 may include additional blocks, fewer blocks, different blocks, or differently arranged blocks than those depicted in FIG. 4. Additionally, or alternatively, two or more of the blocks of process 400 may be performed in parallel.

INDUSTRIAL APPLICABILITY

A work machine may be provided with a steering system that allows the work machine to shift, lean, pivot, rotate, articulate, and/or otherwise move during idle. A work machine may also be provided with an implement system that allows an implement to be manipulated and/or moved relative to the work machine during idle. The steering system and the implement system may be manually controlled by an operator via a user interface provided within an operator cab of the work machine. The user interface may include an input device that enables the operator to control a function of the work machine. When not in use, one or more functions of the work machine may be disabled by the operator to avoid inadvertent steering input and/or implement input. In some cases, an operator may neglect to disable a function of the work machine prior to exiting the operator cab and inadvertently input a command (e.g., while exiting, entering, or moving about the operator cab) that causes the work machine and/or the implement to move and potentially collide with a nearby object.

An operator detection system described herein provides more accurate detection of an operator and more reliable implementation of a lockout mode. For example, the operator detection system may receive a detection signal from a detection device (e.g., a seat sensor, an arm rest sensor, an arm rest latch, and/or the like) of the work machine, receive an input signal from an input device (e.g., a brake control pedal, a torque control pedal, a throttle control pedal, a clutch pedal, a direction control switch, a steering control lever, an implement control lever, a control panel, a touchscreen display, a microphone, and/or the like), determine an availability of the operator based on the detection signal and the input signal, and enable a lockout mode (e.g., restricting operator control of a function of the work machine) if the operator is unavailable. While the lockout mode is enabled, the operator detection system may determine the availability of the operator, determine a readiness indicator confirming a readiness of the operator, and disable the lockout mode based on the readiness indicator. The operator detection system may determine the readiness indicator based on a comparison between the detection signal and/or the input signal and a readiness criterion.

Accordingly, the operator detection system may provide an additional measure that ensures that operator controls are not prematurely restricted while an operator is operating a work machine, and ensures that operator controls are not prematurely enabled when the operator is not mentally prepared to operate the work machine. For instance, by prompting the operator to demonstrate readiness prior to restoring operator control of a steering function and/or an implement function, the operator detection system may further reduce a potential for inadvertent actuation of the steering function and/or the implement function. Also, by incorporating information from different detection devices and/or input devices, the operator detection system may provide a solution that can be reliably used in configurations of operator cabs that may not have an arm rest or that may not require an arm rest to be raised or lowered to enter or exit the operator cab. Furthermore, the operator detection system may disable operator controls without disabling power to a steering system and/or an implement system, and thereby reduces a potential for damage to components of the work machine that can be caused by abrupt power loss. In such a way, the operator detection system may be used to maintain components of the work machine in optimal operating condition, reduce downtime, and increase overall productivity.

What is claimed is:

1. A method, comprising:
   determining, by a device, that an operator, of a work machine, is unavailable;
   enabling, by the device, a lockout mode based on determining that the operator is unavailable,
      the lockout mode being configured to restrict operator control of at least one function of the work machine;
   determining, by the device, while the lockout mode is enabled, that the operator is ready to operate the work machine based on an indication that the operator is seated and one or more of:
      an indication that an arm rest, of the work machine, has been cycled, or
      an indication regarding a depression of a pedal of the work machine; and
   disabling, by the device, the lockout mode based on determining that the operator is ready to operate the work machine.

2. The method of claim 1, wherein determining that the operator is unavailable comprises:
   determining that the operator is unavailable based on determining that the operator is not present relative to a user interface of the work machine and not providing operator input to the user interface.

3. The method of claim 1, wherein enabling the lockout mode comprises one or more of:
   engaging a parking brake of the work machine; and
   one or more of:
      restricting operator control of a steering function of the work machine,
         the lockout mode disabling communication between a steering control lever and a steering system of the work machine; or
      restricting operator control of an implement function of the work machine,
         the lockout mode disabling communication between an implement control lever and an implement system of the work machine.

4. The method of claim 1, further comprising:
   determining the indication that the arm rest has been cycled based on an arm rest latch of the work machine,
      the arm rest latch being installed in the arm rest and configured to detect a motion of the arm rest, and
      the indication that the arm rest has been cycled indicating that the arm rest was raised and lowered while the lockout mode is enabled.

5. The method of claim 1, further comprising:
   determining the indication regarding the depression of the pedal based on determining that the pedal is depressed a threshold amount.

6. The method of claim 1, wherein disabling the lockout mode comprises one or more of:
   enabling communication between a steering control lever and a steering system of the work machine;
   enabling communication between an implement control lever and an implement system of the work machine; or
   enabling operator control of a parking brake of the work machine.

7. The method of claim 1,
   wherein the indication that the operator is seated is from a pressure sensor of a seat of the work machine,
   wherein the indication that the arm rest has been cycled indicates that the arm rest has been raised and lowered in association with the lockout mode, and
   wherein the indication regarding the depression of the pedal indicates that a brake control pedal is depressed one or more of a threshold amount or for a threshold duration.

8. A device, comprising:
   one or more memories; and
   one or more processors, communicatively coupled to the one or more memories, configured to:
      determine that an operator, of a work machine, is unavailable;
      enable a lockout mode based on determining that the operator is unavailable,
         the lockout mode being configured to restrict operator control of a function of the work machine;
      determine, while the lockout mode is enabled, that the operator is ready to operate the work machine based on an indication that the operator is seated and one or more of:
         an indication that an arm rest, of the work machine, has been cycled, or
         an indication regarding a depression of a pedal of the work machine; and
      cause an action to be performed in connection with one or more of the lockout mode or the operator being ready to operate the work machine.

9. The device of claim 8, wherein the one or more processors are configured to, when determining that the operator is unavailable:
   determine that the operator is unavailable based on determining that the operator is not seated in a seat of the work machine, not operating the work machine in a drive mode, and not pressing the pedal.

10. The device of claim 8, wherein the one or more processors are further configured to:
    determine the indication that the arm rest has been cycled based on an arm rest latch of the work machine,
       the arm rest latch being installed in the arm rest and configured to detect a motion of the arm rest, and
       the indication that the arm rest has been cycled indicating that the arm rest was raised and lowered while the lockout mode is enabled.

11. The device of claim 8, wherein the one or more processors are further configured to:
    determine the indication regarding the depression of the pedal based on determining that the pedal is depressed a threshold amount.

12. The device of claim 8, wherein the one or more processors are configured to, when causing the action to be performed:
    enable communication between a steering control lever and a steering system of the work machine.

13. The device of claim 8, wherein the one or more processors are configured to, when causing the action to be performed:
    generate a lockout event based on determining that the lockout mode was enabled; and
    generate one or more of a record or a notification of the lockout event.

14. The device of claim 8,
    wherein the indication that the operator is seated is from a pressure sensor of a seat of the work machine, wherein the indication that the arm rest has been cycled indicates that the arm rest has been raised and lowered in association with the lockout mode, and wherein the indication regarding the depression of the pedal indicates that a brake control pedal is depressed one or more of a threshold amount or for a threshold duration.

15. A work machine, comprising:

a steering system;

a user interface configured to generate an input signal corresponding to operator input;

a detection device configured to generate a detection signal corresponding to a presence of an operator relative to the user interface; and a control device in communication with the steering system, the user interface, and the detection device, the control device being configured to:

determine that the operator is unavailable based on the detection signal and the input signal, enable a lockout mode based on determining that the operator is unavailable, the lockout mode restricting operator control of the steering system, determine, while the lockout mode is enabled, that the operator is ready to operate the work machine based on an indication that the operator is seated and one or more of:

an indication that an arm rest, of the work machine, has been cycled, or an indication regarding a depression of a pedal of the work machine, and disable the lockout mode based on determining that the operator is ready to operate the work machine.

16. The work machine of claim 15, wherein the detection device includes one or more of a seat sensor, an arm rest sensor, or an arm rest latch, the seat sensor being installed in a seat of the work machine and configured to detect a weight of the operator, the arm rest sensor being installed in an arm rest of the work machine and configured to detect a position of the arm rest, and the arm rest latch being installed in the arm rest and configured to detect a motion of the arm rest.

17. The work machine of claim 15, wherein the one or more processors are further configured to:

determine the indication that the arm rest has been cycled based on an arm rest latch of the work machine, the arm rest latch being installed in the arm rest and configured to detect a motion of the arm rest, and the indication that the arm rest has been cycled indicating that the arm rest was raised and lowered while the lockout mode is enabled.

18. The work machine of claim 15, wherein the one or more processors are further configured to:

determine the indication regarding the depression of the pedal based on determining that the pedal is depressed a threshold amount.

19. The work machine of claim 15, wherein the control device is configured to, when enabling the lockout mode:

engage a parking brake of the work machine, and restrict operator control of a steering function of the work machine, the lockout mode disabling communication between a steering control lever and the steering system of the work machine.

20. The work machine of claim 15, wherein the indication that the operator is seated is from a pressure sensor of a seat of the work machine, wherein the indication that the arm rest has been cycled indicates that the arm rest has been raised and lowered in association with the lockout mode, and wherein the indication regarding the depression of the pedal indicates that a brake control pedal is depressed one or more of a threshold amount or for a threshold duration.

* * * * *